Patented July 30, 1929.

1,722,927

UNITED STATES PATENT OFFICE.

LEON LILIENFELD, OF VIENNA, AUSTRIA.

CELLULOSE DERIVATIVE AND PROCESS FOR PRODUCING SAME.

No Drawing. Application filed March 17, 1925, Serial No. 16,258, and in Austria April 4, 1924. Renewed June 1, 1929.

In British Specification 166,767 (also U. S. Patent 1,502,379) a process is described in which cellulose is treated with halohydrins of poly-alcohols. Said specification does not contain any statement as to the properties and solubilities of the final products obtained. From the descriptive part and the examples (both lean upon British Specification 164,374) it can however be clearly seen that the object of the British Specification 166,767 is the production of cellulose ethers which, with regard to their properties, correspond with the water-insoluble alkyl ethers of cellulose, i. e. which are soluble in volatile organic solvents and from such solutions remain in the shape of coherent, water-insoluble products, as film, threads, plastic masses and the like. This follows not only from the proportions of alkali and halohydrin to cellulose used in the examples, but also from the description in which stress is laid upon concentrated alkali solutions (alkali solutions of 50-95 per cent. strength are stated as preferable), in which it is said that reduced quantities of water, or even no water at all is preferably employed and in which it is stated that the final products are suitable for the various applications for which cellulose ethers or esters are suitable.

The present invention is based upon the discovery that technically valuable cellulose derivatives soluble in aqueous alkalies, but insoluble in water are obtained by acting on cellulose with a halohydrin, particularly a monohalohydrin of a poly-alcohol in the presence of a caustic alkali solution of less than 50 per cent. strength, preferably up to 25 per cent. strength.

The new derivatives of cellulose, soluble in aqueous alkalies, but insoluble in water, are insoluble in the ordinary organic solvents such as alcohol, acetone, glacial acetic acid, benzene, chloroform, ether and the like. They may be precipitated from their solutions in alkalies by means of a suitable precipitating agent such as an acid, a salt, an acid and a salt, an alcohol, acetone and the like. If their solutions or pastes be brought into the form of technical products, such as threads, films, plates or the like and treated with a suitable precipitating agent, either immediately or after previously drying, they solidify to transparent articles, which when wet are clear and possess considerable tensile strength, and after having been washed and dried, are lustrous, transparent and flexible.

The new derivative of cellulose are accordingly suitable for the manufacture of a large number of technical products. As examples of such products there may be mentioned: artificial threads, films, plates, plastic compositions, coatings and layers of all kinds, textile-finishing compositions which are insoluble in water, preparations for sizing yarns, thickening agents for textile-printing, fixing agents for pigments, binding agents, bookcloth and the like.

Those oxy-alkyl derivatives of cellulose which are soluble in alkalies but insoluble in water are superior in many respects to the hitherto known cellulose compounds which are soluble in alkalies. As compared with the cellulose xanthates they possess the following advantages: They are durable and do not undergo alteration either in the solid or dissolved state; they are of uniform quality, can be conveyed in the form of the substance itself and in solution; their solutions and the products prepared from them are colourless; they are free from injurious by-products which contaminate the precipitating baths; they may be more readily precipitated (for example even by dilute organic acids, tannin, formalin or the like); they do not evolve hydrogen sulphide or other noxious gases, or give rise to separation of sulphur during the precipitating operation; and, so far as the process of manufacture is concerned, the reagents used are incombustible, non-poisonous, odourless and non-volatile, and therefore the process does not require special precautions to be taken, thus making it possible to conduct the manufacture in open vessels.

The processes described in the British specifications Nos. 177,810, 203,346 and 203,347 for the manufacture of alkyl derivatives of cellulose soluble in alkalies, are in many respects surpassed by the process herein described; the new oxy- and hydroxy-alkyl celluloses are moreover superior in many respects to the products obtainable by the processes described in the said specifications. The possibility of conducting the process without extraneous supply of heat not only renders it more simple, handy, and economical, but also affords considerable protection of the cellulose molecule against alkalies to which it is particularly sensitive at raised temperatures. The most important advantage, however, lies in the superiority of the new cellulose compounds which, in the form of technical products such as films, threads, coverings or the like, swell less when brought into contact with water, possess greater tensile strength, and when dry are more flexible, than the alkyl derivatives which are soluble in alkalies.

The new cellulose derivatives are distinguished for their inertness, their resistance towards alkalies, their durability, and the transparency and flexibility of the products manufactured from them.

In carrying out the process bleached or unbleached cellulose, a material containing cellulose, or a conversion product of cellulose which is insoluble in alkalies is treated with a halohydrin of a poly-alchohol in the presence of a caustic alkali solution of less than 50 per cent. strength, preferably up to 25 per cent. strength. The most important derivatives of the poly-alcohols are the mono-halogen derivatives, since the use of a halohydrin which is richer in halogen (such as α-α-dichlorhydrin, for example) sometimes results in products which are insoluble either in alkalies or in water.

The conversion occurs even without extraneous supply of heat. It is obvious, however, that if desired, the process may also be carried out by warming or heating the alkali-cellulose prior to, or during or after the addition of the halo-hydrin.

The alkali may be added either by impregnating the cellulose with an excess of an aqueous or alcoholic solution of the alkali, and removing the excess of the alkali lye by pressing, centrifuging or the like, or by mixing or kneading the cellulose with the required quantity of an aqueous or alcoholic solution of the alkali.

It may be taken as a rule, although the invention is not intended to be confined thereto, that the new cellulose derivatives are formed in the presence of a weak alkali solution, (for instance, a caustic soda solution of 10 to 20 per cent. strength) even when large quantities of the halohydrin of the poly-alcohol are used (in some cases, even as much as one molecular proportion or halohydrin and more for each molecular proportion of alkali); but that, in the presence of a stronger alkali solution (for instance, a caustic soda solution of 30 to 50 per cent. strength) they are formed when a smaller quantity of the halohydrin is used (for instance from 0.3 to 0.75 molecular proportions of the halohydrin for each molecular proportion of alkali, according to the strength and the quantity of the solution of the caustic alkali).

The treatment of the cellulose with alkali and with the halohydrin may be carried out simultaneously, or successively in either order.

The halohydrins are added to the alkali cellulose either in an undiluted state or diluted with a suitable diluent (such as water, ether, alcohol, or the like).

The reaction occurs comparatively rapidly, so that even very soon after the alkali-cellulose and the halohydrin have been mixed the reaction mixture contains appreciable quantities of the final product. The mixture may however be allowed to stand for some considerable time before it is worked up.

The cellulose may also be converted in the presence of a contact substance such as copper, silver, iron, benzoyl-superoxide or the like.

In order to work up the reaction mixture after the reaction is completed the reaction mixture is either dissolved as such by the addition of water (when unused alkali is present in sufficient quantity), or of a solution of caustic alkali, and is put to the technical use required if necessary after previously filtering, straining through cloth or centrifuging, or the final product is isolated, for example by merely washing the reaction mass with water or other solvent for alkalies and salts (for instance, aqueous alcohol). The washing may also be preceded by neutralization of the alkali present in the reaction mixture, or by an acidification of the mixture particularly when there is present in the mixture a large excess of alkali which would bring the final product into solution on addition of water. The washed oxy-alkyl derivative of cellulose may then either be dissolved in an alkali or dried. The isolation of the product may also be carried out in the following manner: The reaction mixture is dissolved by the addition of either water or an alkali lye, the solution is freed if necessary from insoluble constituents by filtering, straining, contrifuging or the like, and then mixed with an acid, an acid salt, or any other substance capable of neutralizing the alkali. such as an ammonium salt, in quantity sufficient to neutralize the alkali, or in excess of this quantity, and the precipitate is thoroughly washed and, if desired, dried. The drying may also be preceded by a dehydration with alcohol. The compounds isolated by any method may be purified by dissolving in a dilute solution of an alkali and precipitating by means of an acid or the like.

When acted on by a concentrated hydrohalogen acid (such as hydriodic acid or hydro-chloric acid), by phosphorus iodide and water, or by a dilute hydro-halogen acid under pressure, the oxy- or hydroxy-alkyl celluloses yield by decomposition the corresponding polyvalent alcohol or its halogen derivatives.

The following examples illustrate the invention, the parts being by weight:

1. 100 parts of sulphite-cellulose (in fleece- or sheet-form) or cotton linters are soaked in 1000 to 2000 parts of a solution of caustic alkali of 18 per cent. strength at 15° to 20° C. until uniformly impregnated, and then allowed to stand in a tightly closed vessel for 3 to 24 hours at ordinary temperature. The mixture is then pressed or centrifuged to 350 parts and comminuted in a shredder, advantageously whilst cooling, or in a willowing machine or edge mill until it is uniform. The soda-cellulose either immediately after it has been ground or after having been left to ripen for a long or short period (for example 3 to 72 hours) is mixed in a vessel preferably provided with a stirring, kneading or mixing apparatus with 30 to 60 parts of $\alpha$-monochlorhydrin ($\gamma$-chloro-propylene-glycol) which may be added all at once or in small portions. In order to obtain as uniform a distribution of the monochlorhydrin as possible it is advisable to knead the mass during the addition or to rub, stir or agitate it. After the $\alpha$-monochlorhydrin has been kneaded or stirred in, the mixture is stirred for a further period (for instance for half an hour to two hours).

The examination of samples taken at short intervals of time shows that the mass has become soluble in dilute caustic soda solution (for instance of 5 to 10 per cent. strength) at least in greater part, even after a comparatively short time (for example after a few hours.) The reaction mixture, which has the appearance of unchanged soda-cellulose, is practically insoluble in water. It is dissolved either immediately or after it has been allowed to stand for 10 to 30 hours, and either as such or after it has been previously neutralised, or acidified and washed, or merely washed, in a dilute solution of caustic soda (for example one of from 4 to 8 per cent. strength), and then either put to some technical use, or the reaction product contained therein is isolated. For this purpose the reaction mass is dissolved in from 6000 to 12000 parts of a solution of caustic soda of 5 to 8 per cent. strength, freed from any undissolved constituents that may be present by filtration, straining, centrifuging or the like and mixed with a dilute acid, for instance sulphuric acid or acetic acid of 10–20 per cent. strength, until the final product of the reaction is completely precipitated. The substance, which is precipitated in hard flakes or lumps is then freed from the mother liquor by means of a filtering apparatus such as a filter press, vacuum filter, filter or the like, washed with water until free from acid and salts, and is dried either at atmospheric or reduced pressure, if necessary, after dehydrating it by means of alcohol and washing with ether. When ground it forms a white powder, which is insoluble in water and organic solvents, but soluble in dilute alkalies such as a solution of caustic soda of 5–8 per cent. strength. A solution of the product in caustic soda of 5–10 per cent. strength is clear and viscous, and when spread on a glass plate and treated with a dilute acid or any other precipitating bath known in the viscose industry, it yields a clear film possessing considerable tensile strength and which after being washed and dried is transparent and flexible.

If the substance be decomposed by means of hydriodic acid, or by boiling it with concentrated hydrochloric acid, or even by heating it with dilute hydrochloric acid under pressure, glycerine can be detected in the liquid.

2. The procedure is as in Example 1, with the difference that the soda-cellulose is pressed to 600 to 800 parts and that there is added 40 to 80 parts $\alpha$-monochlorhydrin.

The final product resembles in its appearance and properties that obtained by the method described in Example 1.

3. The procedure is as in Example 1, with the difference that the soda-cellulose is pressed to 200 to 250 parts and mixed with 40 to 80 parts of $\alpha$-monochlorhydrin.

The final product corresponds in its properties with that obtained by the method described in Example 1.

4. The procedure is as in Example 1, with the difference that instead of the caustic soda solution of 18 per cent. strength, there is used a caustic soda solution of 25 per cent. strength, that the soda cellulose is pressed to 300 parts and there is added 40 parts of $\alpha$-monochlorhydrin.

The final product corresponds in its properties with that obtained by the method described in Example 1.

5. The procedure is as in Example 1, with the difference that instead of $\alpha$-monochlorhydrin 30 to 60 parts of ethylenechlorhydrin are added to the soda-cellulose.

The final product forms white flakes or a white powder, readily soluble in dilute solutions of caustic alkalies. Its solution in alkali when spread on a glass plate and treated with a suitable precipitating agent, such as dilute sulphuric acid or the like, solidifies to a skin clear as glass, which when wet is remarkably tough, and when dry is transparent and flexible.

When the product is decomposed with a hydrohalogen acid ethylene-glycol is eliminated.

The soda-celluloses used in any of Examples 1 to 5 may also be prepared by mixing the cellulose in a suitable mixing apparatus, for example, a kneading machine, a shredder, an edge mill or the like, with the amount of caustic soda solution which remains in the soda-cellulose after it has been pressed and may be treated with the halohydrin either immediately after the mixing process or after it has been allowed to stand for some time.

6. 100 parts of sulphite-cellulose or linters are soaked in a solution of caustic soda prepared by dissolving 400 parts of caustic soda in 666 parts of water and mixing the solution with 1150 parts of alcohol of 96 per cent. strength. After it has been mixed until it is uniform in a suitable apparatus such as a kneading machine or a tightly closed shredder the mixture is allowed to stand in a tightly closed vessel for 3 to 24 hours, after which it is pressed to 350 parts and disintegrated in a tightly closed shredder preferably whilst cooling for 1 to 2 hours. The mass is then mixed whilst stirring or kneading with 30 to 40 parts of α-monochlorhydrin in one addition, or in several portions; the mixture is further kneaded or stirred for half an hour to 2 hours and then allowed to stand at ordinary temperature. Even after a few hours it has become soluble at least in great part in dilute solutions of caustic alkalies. After standing for about 24 hours it is worked up as described in Example 1.

The final product resembles in its properties and appearance that described in Example 1.

7. 100 parts of sulphite-cellulose or linters are uniformly soaked, preferably whilst kneading or stirring, in a caustic soda solution prepared by dissolving 600 parts of caustic soda in 600 parts of water and adding to the solution 1000 parts of alcohol. After the mass has stood for 10 to 20 hours at ordinary temperature it is pressed to 890 parts and comminuted in a cooled shredder for about one hour. It is then mixed either immediately after its comminution or after it has stood for 20 to 40 hours, with 100 to 150 parts of epichlorhydrin added in one portion or in several portions, whilst stirring, kneading or the like; it is then allowed to stand for 24 hours and is finally worked up as described in Example 1.

The product is flocculent or powdery, and dissolves in dilute alkalies, from which it may be precipitated by acidification.

In the foregoing examples, in order to accelerate the reaction, hot soda-cellulose may be used as parent material, or the reaction mixture may be warmed. A contact substance (such as powdered copper, iron, silver, or benzoyl-superoxide) may be added to the reaction mixture.

Instead of bleached or unbleached cellulose a conversion product of cellulose which is insoluble in alkalies may be used as the parent material, (for instance a cellulose which has been hydrated or hydrolysed by chemical action such as by mercerization with subsequent washing and if necessary drying; by the action of a strong mineral acid, by heating with a weak mineral acid; or by treatment with a zinc halide; or by a mechanical process such as grinding in the presence of water, or the like; or an oxy-cellulose which is insoluble in alkalies), in short any body of the cellulose group which has been proposed for the manufacture of viscose or ammoniacal-copper-oxide cellulose.

In the specification and the claims wherever the context permits, the expression "cellulose" includes the above-mentioned compounds of the cellulose group.

The expression "halohydrin of a poly-alcohol" used in the specification and the claims includes wherever the context permits the compounds containing both a halogen and a hydroxyl group which may be regarded as being derived from a poly-hydroxy-alcohol by the partial exchange of the hydroxyl groups and chlorine, bromine or iodine (or from a mono- or poly-hydroxy alcohol by the substitution of one or more hydrogen atoms in the alcohol radical), and the derivatives (such as the esters) or internal anhydrides (such as epichlorhydrin) of such halohydrins, or substances or mixtures of substances which are capable of yielding such halohydrins.

The expression "in the form of unshaped products" used in the claims includes: flakes, powder, sand, crumbs, grains, solutions, pastes, or the like.

I claim:

1. A process for the manufacture of new cellulose derivatives, which are soluble in aqueous caustic alkalies, but insoluble in water, which process comprises acting on cellulose with a halohydrin of a poly-alcohol in the presence of a caustic alkali solution of substantially less than 50 per cent. strength.

2. A process for the manufacture of new cellulose derivatives, which are soluble in aqueous caustic alkalies, but insoluble in water, which process comprises acting on cellulose with a halohydrin of a poly-alcohol in the presence of a caustic alkali solution of no more than 25 per cent. strength.

3. A process for the manufacture of new cellulose derivatives, which are soluble in aqueous caustic alkalies, but insoluble in water, which process comprises acting on cellulose with a monohalohydrin of a poly-alcohol in the presence of a caustic alkali solution of substantially less than 50 per cent. strength.

4. A process for the manufacture of new cellulose derivatives, which are soluble in aqueous caustic alkalies, but insoluble in water, which process comprises acting on cellulose with a monohalohydrin of a poly-alcohol in the presence of a caustic alkali solution of no more than 25 per cent. strength.

5. A process for the manufacture of new cellulose derivatives, which are soluble in aqueous caustic alkalies, but insoluble in water, which process comprises acting on cellulose with a halohydrin of a glycol in the presence of a caustic alkali solution of substantially less than 50 per cent. strength.

6. A process for the manufacture of new cellulose derivatives, which are soluble in aqueous caustic alkalies, but insoluble in water, which process comprises acting on cellulose with a halohydrin of a glycol in the presence of a caustic alkali solution of no more than 25 per cent. strength.

7. A process for the manufacture of new cellulose derivatives, which are soluble in aqueous caustic alkalies, but insoluble in water, which process comprises acting on cellulose with ethylene chlorhydrin in the presence of a caustic alkali solution of substantially less than 50 per cent. strength.

8. A process for the manufacture of new cellulose derivatives, which are soluble in aqueous caustic alkalies, but insoluble in water, which process comprises acting on cellulose with ethylene chlorhydrin in the presence of a caustic alkali solution of no more than 25 per cent. strength.

9. A process for the manufacture of new cellulose derivatives, which are soluble in aqueous caustic alkalies, but insoluble in water, which process comprises acting on cellulose with a monohalohydrin of a poly-alcohol in the presence of a caustic alkali solution of substantially less than 50 per cent. strength without extraneous supply of heat.

10. As new products, cellulose derivatives in the form of unshaped products and soluble in alkalies but insoluble in water and organic solvents such as alcohol and ether, in which derivatives at least one hydroxyl hydrogen atom of the cellulose is replaced by an oxygen containing alkyl group.

11. As new products, cellulose derivatives in the form of unshaped products and soluble in alkalies but insoluble in water and organic solvents such as alcohol and ether, in which derivatives at least one hydroxyl hydrogen atom of the cellulose is replaced by a hydroxy-ethyl group.

12. As new products, alkali-soluble, but water-insoluble cellulose derivatives in the form of unshaped products, in which derivatives a poly-alcohol of acyclic structure can be detected on decomposition with a hydro-halogen acid, said derivatives being insoluble in organic solvents such as acetone and chloroform.

13. As new products, alkali-soluble, but water-insoluble cellulose derivatives in the form of unshaped products, in which derivatives ethylene-glycol can be detected on decomposition with a hydro-halogen acid, said derivatives being insoluble in organic solvents such as acetone and chloroform.

14. The process for the manufacture of new cellulose compounds, which are soluble in aqueous caustic alkalies, but insoluble in water, which process comprises reacting upon cellulose with a halohydrin of a poly-alcohol in the presence of an aqueous caustic alkali solution of substantially less than 50 per cent strength.

15. The process for the manufacture of new cellulose compounds, which are soluble in aqueous caustic alkalies, but insoluble in water, which process comprises reacting upon cellulose with a halohydrin of a poly-alcohol in the presence of an aqueous caustic alkali solution of not more than 25 per cent strength.

16. As a new product a cellulose derivative soluble in aqueous caustic alkalies but insoluble in water, alcohol and ether, in which derivative at least one hydroxyl hydrogen atom of the cellulose is replaced by an oxygen containing alkyl group.

17. As a new product a cellulose derivative soluble in aqueous caustic alkalies but insoluble in water, alcohol and ether, in which derivative at least one hydroxyl hydrogen atom of the cellulose is replaced by a hydroxy-alkyl group.

In testimony whereof I affix my signature.

LEON LILIENFELD.